United States Patent [19]
Jasne

[11] Patent Number: 5,130,054
[45] Date of Patent: Jul. 14, 1992

[54] PROCESSABLE CONDUCTIVE POLYMERS

[75] Inventor: Stanley J. Jasne, Andover, Mass.

[73] Assignee: Polaroid Corporation, Cambridge, Mass.

[21] Appl. No.: 595,667

[22] Filed: Apr. 2, 1984

[51] Int. Cl.$^5$ .................. H01B 1/00; C08F 26/06; C08G 73/06

[52] U.S. Cl. .................. 252/500; 526/258; 528/423

[58] Field of Search .............. 252/500; 526/258, 259; 528/423

[56] References Cited

U.S. PATENT DOCUMENTS

| | | | |
|---|---|---|---|
| 4,321,114 | 3/1982 | MacDiarmid et al. | 204/2.1 |
| 4,395,497 | 7/1983 | Naarmann et al. | 252/500 |
| 4,401,545 | 8/1983 | Naarmann et al. | 252/500 |
| 4,552,927 | 11/1985 | Warren | 525/279 |

OTHER PUBLICATIONS

"Molecular Crystals and Liquid Crystals, Proceedings of the Symposium on Order in Polymeric Materials", vol. 106, Nos. 3 & 4 (1984) G. Wegner.

Primary Examiner—John Niebling
Assistant Examiner—Steven P. Marquis
Attorney, Agent, or Firm—Louis G. Xiarhox

[57] ABSTRACT

Processable conductive polymers and a method for their production are disclosed. The processable conductive organic polymers comprise the cationic electropolymerized polymer of an electropolymerizable monomer and, as a counterion in affiliation therewith, a polymer being anionic surface character, the counterion polymer having effective to confer processability. During the production of the conductive polymer from the electropolymerizable monomer, a polymeric electrolyte having anionic surface character is present as a dispersed phase and functions as the counterion.

27 Claims, No Drawings

PROCESSABLE CONDUCTIVE POLYMERS

BACKGROUND OF THE INVENTION

This invention relates to the production of conductive organic polymers. More particularly, it relates to processable conductive organic polymers and to a method for their production.

Considerable effort has been expended by researchers toward the production of polymers which exhibit electrical conductivity. Various approaches to the creation of such materials are described, for example, by J. Frommer, in "Polymer research frontier: How insulators become conductors", Industrial Chemical News, Vol. 4, No. 10, October 1983.

Polymeric materials which have been proposed as conductive polymers, for the most part, are characterized by instability under ambient conditions, poor physical integrity (notably brittleness) or poor processability (insolubility or intractability) severely limiting the production or fabrication of conductive polymeric articles by conventional production or processing techniques.

While various applications for conductive polymers have been proposed, for example, in the manufacture of solar cells and batteries and for EMI shielding, the physical properties and/or processability of a conductive polymeric material will dictate in part the suitability of such material to a particular application. Accordingly, it will be appreciated that a need exists for a polymeric material which exhibits electrical conductivity but which also exhibits improved processability.

SUMMARY OF THE INVENTION

It has been found that a processable electrically conductive organic polymeric material can be provided by utilizing, as a counteranion in the production of a conductive polymer by the electrochemical polymerization of an electropolymerizable monomer, a dispersed phase of a polymer having a negatively charged surface character. The utilization of a polymeric counteranion, in affiliation with the cationic charges of an electropolymerized polymer, confers plasticizing and flexibilizing properties to the resulting electropolymerized material. Accordingly, in its product aspect, the present invention provides a processable electrically conductive organic polymer having improved flexibility and physical integrity, the conductive polymer comprising the cationic electropolymerized polymer of an electropolymerizable monomer and, as a counterion in affiliation with said cationic electropolymerized polymer, a polymer having anionic surface character, the counterion polymer being effective to confer processability to said conductive organic polymer.

In its method aspect, there is provided a method for the production of a processable electrically conductive organic polymer as aforedescribed, which method comprises electropolymerizing an electropolymerizable monomer in an electrolytic medium comprising a reaction solvent; the electropolymerizable monomer; and a polymeric electrolyte having anionic surface character and being in a dispersed phase in the electrolytic medium during the electropolymerization of the electropolymerizable monomer.

For a fuller understanding of the present invention, reference should be made to the following detailed description.

DETAILED DESCRIPTION OF THE INVENTION

A variety of electropolymerizable monomeric compounds can be used for the production of processable conductive polymers of the invention. Suitable electropolymerizable monomers will exhibit solubility in the reaction solvent of the electrolytic medium and will have an oxidation potential below that of the reaction solvent. In general, the monomeric compound to be electropolymerized will be soluble in the reaction solvent at least to the extent of $10^{-5}$ Molar. Preferably, the compound will be dissolved in the solvent medium at a concentration of from $10^{-2}$ to $10^{-1}$ Molar, although the concentration utilized will depend upon the particular nature of the polymerizable compound and reaction solvent employed and the desired rate of polymerization.

Aromatic heterocyclic compounds useful in the method of the present invention include pyrrole; N-substituted pyrroles; $\beta$-substituted pyrroles; thiophene; $\beta$-substituted thiophenes; furan; $\beta$-substituted furans; indole; and carbazole. Any electropolymerizable monomer can, however, be employed, provided that the oxidation potential thereof is lower than that of the solvent in which the polymerization is to occur. The electropolymerizable compound useful in the production of polymers of this invention can be substituted with one or more substituent groups. In the case of a 5-membered heterocyclic compound, the $\alpha\alpha'$-positions will be unsubstituted so as to permit $\alpha$, $\alpha'$-coupling of monomeric units in a polymer chain. It will be appreciated that the presence of substituent groups will influence the required oxidation potential for the conduct of the desired polymerization, the rate of polymerization at a fixed voltage or current or the properties of the resulting polymer. Suitable substituent groups include alkyl, aryl, aralkyl, alkaryl, hydroxy, methoxy, chloro, bromo and nitro substituents. Suitable substituent groups can be selected consistent with desired electropolymerization conditions and the properties desired in the resulting polymer.

A preferred class of aromatic heterocyclic compounds for the production of the conductive polymers of the present invention includes the 5-membered heterocyclic compounds having the formula

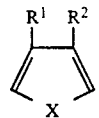

wherein each of $R^1$ and $R^2$ is independently hydrogen; alkyl (e.g., methyl or ethyl); aryl (e.g., phenyl); alkaryl (e.g. tolyl); or aralkyl (e.g., benzyl); or $R^1$ and $R^2$ together comprise the atoms necessary to complete a cyclic (e.g. benzo) structure; and X is —O—; —S—; or

where $R^3$ is hydrogen, alkyl, aryl, alkaryl or aralkyl. These compounds provide in the resulting electropolymerized material, repeating units of the formula

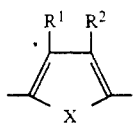

wherein $R^1$, $R^2$ and X have the definitions set forth hereinbefore.

Preferred monomers include pyrrole and the substituted pyrroles such as $\beta$-$\beta'$-dimethylpyrrole and $\beta$-$\beta'$-diphenylpyrrole. The polymerizable monomer of choice is pyrrole which polymerizes readily and which in affiliation with a polyanionic counterion permits the facile production of a conductive polymeric material characterized by stability and processability.

The electropolymerization reaction will be effected in a solvent medium which will include the polymerizable monomer and the polymeric electrolyte. The nature of the solvent can vary widely depending upon the nature of the polymerizable monomer and the polyelectrolyte employed. The oxidation potential of the solvent will be higher than that of the polymerizable monomer so as not be preferentially oxidized Preferably, the solvent will be poorly nucleophilic so as not to preferentially capture cation intermediates of the polymerizable monomer. Suitable examples include water, acetonitrile, dimethylsulfoxide and benzonitrile. Mixed aqueous organic solvent mixtures can also be employed. In the case of pyrrole, a preferred polymerizable monomer, water can be conveniently employed for production of conductive polymers having improved processability.

The dispersed-phase polyanionic counteranion employed as the electrolyte for the production of conductive polymers of the invention provides the electrochemical neutrality for the cationic polymer produced by oxidative electropolymerization and serves an important function in conferring processability to the resulting conductive polymer. In the production of a conductive polymer of the invention, from an electropolymerizable monomer such as pyrrole, thiophene or the like, the anion of the supporting electrolyte will comprise an integral portion of the resulting organic conducting polymer. The stoichiometry of, for example, a conductive polymer of an aromatic heterocyclic compound, can be appreciated by reference to the following formula (I) for polypyrrole (Mol. Cryst. Liq. Cryst., 1982, Vol. 83, pp. 253-264):

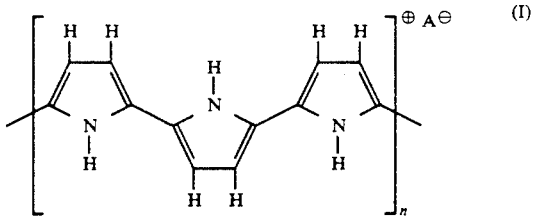

wherein $A^\ominus$ represents the electrochemically stoichiometric anion and n is an integer. It will be seen from inspection of formula (I) that the relative weight of the counteranion $A^\ominus$ in relation to the cationic portion will depend upon its size.

According to the present invention, the anionic portion of the conducting polymer will comprise a bulky counterion as a consequence of employing, as a supporting electrolyte for the desired electropolymerization, a polymer having anionic surface character: The polymeric counteranion comprises a major proportion by weight of the conductive polymer and markedly enhances physical properties and processability. When the counterion is, for example, a sulfonate or sulfate group on the surface of a latex particle, it will have a major influence on the final weight percent of each of the cationic and anionic portions. In general, the polymeric counterion will comprise from about 75% to about 97% by weight of the conductive polymer. Correspondingly, repeating units from the electropolymerizable monomer will comprise from about 3% to about 25% by weight.

The nature of the polymer utilized as a supporting electrolyte can vary with the nature of the physical properties desired in the resulting conductive polymer. Inasmuch as the nature of the counteranion as a bulky moiety in relation to the cationic moiety will cause the counteranion to constitute a relatively large percentage (by weight) of the resulting polymer, it will be appreciated that considerable latitude will be afforded in tailoring the physical properties of a conductive polymer to the predetermined requirements of a particular application by suitable choice of the polyanionic polymeric counterion.

The supporting electrolyte polymer is employed in the electrolytic medium in a dispersed phase. As used herein, a dispersed phase refers to a stable dispersion or emulsion of polymer in the liquid or solvent used to conduct the electropolymerization of the electropolymerizable monomer. The liquid can, and preferably will, be water although other solvent materials, as pointed out hereinbefore, can be used as the solvent for the electropolymerizable monomer. The polyanionic polymer used as the supporting electrolyte must, however, be present during electropolymerization as a dispersed phase so as not to adversely interfere with polymer growth which occurs by electropolymerization of the electropolymerizable monomer at the surface of the electrode (anode). It has been found that a soluble or highly swollen polyanionic supporting electrolyte tends to form a very thin film or coating of conductive material at the anode surface, effectively attenuating further growth of the conductive polymer.

A dispersed phase of polyanionic supporting electrolyte in the electrolytic medium can be conveniently provided by preparing an emulsion polymer or latex according to conventional emulsion polymerization techniques. The preparation of latices is ordinarily accomplished by polymerizing an ethylenically unsaturated monomer (or mixture of copolymerizable ethylenically unsaturated comonomers) in a suitable solvent such as water, a water-soluble hydroxylated organic solvent such as alcohol, polyhydroxy alcohol, keto alcohol, ether alcohol or the like, or in a mixture of water and such a hydroxylated solvent, such a mixture usually containing a major amount of water. The preparation of a latex will normally be accomplished by polymerization of an ethylenically unsaturated monomer (or mixture of comonomers) in the presence of a surfactant, dispersing agent, emulsifier or protective colloid, the material being present in sufficient quantity to cause formation of a stable emulsion. Suitable surfactants, emulsifiers and colloid materials used in the production of latices include cationic materials such as stearyl dimethyl benzyl ammonium chloride; nonionic materials such as alkyl aryl polyether alcohols and sorbitan monooleate; anionic materials such as sodium dodecylbenzene sulfonate, dioctyl sodium sulfosuccinate, sodium salts of alkyl aryl polyether sulfates and sodium alkyl (e.g., lauryl) sulfates; alkali metal salts of lignosulfonic acids, and silicic acids; and colloidal materials such as casein, sodium polyacrylate, carboxymethylcellulose, hydroxyethylcellulose, gelatin, sodium alginate or polyvinyl alcohol. The particular surfactant or like material employed can be varied depending upon the desired properties of the latex polymer and the nature of the polymerizable monomers thereof.

The dispersed phase of polymer used as the supporting electrolyte for the electropolymerization hereof will have a polyanionic surface character. The negatively charged (polyanionic) surface character can be incorporated into the polymeric supporting electrolyte in various ways. For example, an ethylenically unsaturated polymerizable monomer having a strong ionic group, e.g., a sulfate or sulfonate group, can be used as a polymerizable monomer in the production of the polymeric supporting electrolyte. Thus, a copolymerizable surfactant including a polymerizable ethylenically unsaturated moiety and a sulfate or sulfonate group can be polymerized by emulsion polymerization technique with an ethylenically unsaturated monomer or mixture thereof to provide a polymer latex having the anionic surface character of the sulfate or sulfonate moiety. A suitable copolymerizable monomer for this purpose is a copolymerizable short-chain vinyl sulfonate, sodium salt (available as COPS I, Alcolac, Inc.). Also suitable are 2-sulfoethyl methacrylate; 2-acrylamido-2-methylpropanesulfonic acid; vinylbenzene sulfonic acid; sodium vinyl sulfonate; or the salts of any of the aforementioned acids. Other polymerizable monomers capable of introducing anionic character to a dispersed phase of polymer can, however, be suitably employed.

The polyanionic surface character of the polymeric dispersed-phase supporting electrolyte can also be the result of the utilization of an anionic surfactant (having a strong ionic character) in connection with the manufacture of the polymer by emulsion polymerization technique. Thus, a surfactant or emulsifier having, for example, a sulfate or sulfonate moiety can be employed as the surfactant or emulsifier according to known emulsion polymerization technique for the production of a latex having the anionic surface character of the anionic moiety. Any of the anionic surfactants or emulsifiers mentioned hereinbefore can be used for this purpose. It will be preferred, however, to incorporate polyanionic surface character by using a copolymerizable surfactant compound as hereinbefore described.

As mentioned previously, the physical properties of the conductive polymers of the invention will be influenced materially by the nature of the polyanionic counterion polymer and, accordingly, the comonomers utilized in the production of polyanionic polymers can be selected so as to introduce predetermined properties suited to a particular application. Thus, a variety of ethylenically unsaturated compounds can be employed to produce a polymeric polyelectrolyte, provided that surface anionic character is introduced into the polymer and provided that the polyelectrolyte polymer be capable of being in a dispersed state in the electrolytic medium employed for the electrochemical polymerization. Examples of such monomers include the esters of unsaturated alcohols such as vinyl alcohol and allyl alcohol with saturated acids such as acetic, propionic or stearic acids, or with unsaturated acids such as acrylic or methacrylic acids; the esters of saturated alcohols with unsaturated acids such as acrylic and methacrylic acids; vinyl cyclic compounds such as styrene; unsaturated ethers such as methyl vinyl ether, diallyl ether and the like; the unsaturated ketones such as methyl vinyl ketone; unsaturated amides such as acrylamide, methacrylamide and unsaturated N-substituted amides such as N-methyl acrylamide and N-(1,1-dimethyl-3-oxobutyl) acrylamide; unsaturated aliphatic hydrocarbons such as ethylene, propylene and the butenes including butadiene; vinyl halides such as vinyl chloride, vinyl fluoride and vinylidene chloride; esters of unsaturated polyhydric alcohols such as esters of butenediol with saturated or unsaturated acids; unsaturated acids such as acrylic acid, methacrylic acid, maleic, fumaric, citraconic or itaconic acids (or the halides or anhydrides thereof); and unsaturated nitriles such as acrylonitrile or methacrylonitrile. Other polymerizable monomers can be employed to introduce desired properties such as hydrophobicity, hydrophilicity or the like and can contain particular moieties such as silicone, fluoro, oxirane, oximino or other groups to provide properties suited to particular applications.

Preferably the counterion polymer will be prepared by emulsion polymerization and will be in the form of a latex. Known emulsion polymerization techniques as described hereinbefore can be used for this purpose. Free radical catalysts such as the peroxides, alkali metal or ammonium persulfates, azobisisobutyronitrile or the like can be used for the provision of suitable latices. The size of dispersed, e.g., latex, particles and the surface charge density can be varied substantially by resort to variations in the nature of the monomers employed and the conditions of polymerization, as is known by those skilled in the art. In general, polymer particles having an average particle size diameter of 100 to 400 nanometers provide good results. Other particle sizes can, however, be utilized.

A polyanionic polymer can be prepared by other techniques and can then be provided in a liquid medium as a dispersed phase. For example, a solution-polymerized polymer can be dispersed in a non-solvent material. Care should be exercised, however, in the production of a dispersion to avoid conditions promoting appreciable solubilization of the polymer in the desired dispersing medium.

The electrochemical reaction hereof can be conducted according to known methods for effecting electropolymerizations. Typically, a one compartment cell containing the reaction solvent, the polymeric supporting electrolyte and the polymerizable compound will be used. A conventional apparatus comprising platinum working and counter electrodes and a reference electrode (e.g., an aqueous saturated calomel reference electrode or silver/silver nitrate reference electrode) can be suitably employed. Other working electrode materials such as gold metal sheet, tin oxide on glass or indium tin oxide on glass can be used, or other electrode materials that will allow the electrolyzed polymer to build up and to adhere and which will not be electrochemically corroded or damaged under the electropolymerization conditions. The working electrode can vary in shape or configuration although a flat electrode will be preferred for the production thereon of a film of polymer. The electrode can be shaped or masked for electropolymerization of desired shapes or for selective deposition in predetermined areas of the electrode surface.

The reaction conditions of the electropolymerization will vary with the nature of the polymerizable monomer and the solvent. In the case of a preferred monomer (pyrrole) in a preferred solvent (water), electropolymerization can be initiated by raising the potential of the working electrode (against a silver/silver nitrate reference electrode) to about ±0.75 volt. It will be preferred, however, to provide a more readily removeable and more uniform film to utilize a potential of about one volt. The current can be increased after initiation or be held at a fixed amperage sufficient to permit initiation and completion of the desired electropolymerization. The electropolymerization can be effected in an electrolytic medium open to ambient conditions or can be accomplished under an atmosphere of nitrogen. Electropolymerization can be terminated when the polymer is prepared to desired thickness.

The electropolymerized material will normally be formed on the working electrode (anode) and can be a very thin film or a thick deposit, depending upon the polymerization conditions. The electrode can be removed from the electrolytic medium for recovery of the polymer material, which can be scraped, peeled or otherwise removed from the electrode surface as a conductive polymer. The polymeric material will generally be washed with water and allowed to dry. The polymer can be removed from the electrode while still wet or after air or heat drying.

While applicant does not wish to be bound by any particular theory or mechanism in explanation of the manner in which the conductive and processable polymers hereof are electrochemically prepared, it is believed that a series of oxidation and deprotonation steps is involved in the production of a polymer from the electropolymerizable monomer. It is believed that the electropolymerization reaction is allowed to continue in the electrolytic medium by the presence of the polyanionic counteranion polymer in a dispersed state The conductive polymer is generated in the oxidized doped state and can, thereafter, be electrochemically reduced to the undoped neutral state. In the case, for example, of polypyrrole, the structure in the oxidized doped state (II) and in the undoped neutral state (III) can be seen in the following representations:

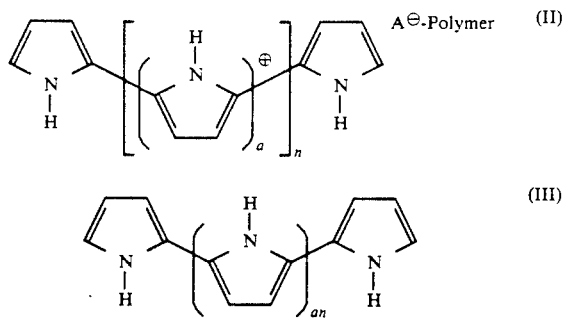

wherein a is a value in the range of about two to about four, depending upon the nature of the charge distribution of the particular counteranion A ⊖ present on the surface of the polyelectrolyte Polymer and n is an integer. It will be appreciated that the presence of a plurality of A ⊖ moieties on the surface of the polymeric electrolyte allows a number of such moieties to be affiliated with the illustrated cation; and it will be understood that not all anionic moieties A ⊖ on the surface of the polyelectrolyte Polymer will be in affiliation with the illustrated cation.

The conductive polymers hereof can be processed or fabricated by resort to known processing techniques. Thus, the polymers can be formed by thermal molding, extrusion or other known shaping technique. The conductive polymer can be taken up into a known solvent for the parent dispersed phase polymer and can be coated onto a substrate material, to provide a conducting layer or film of polymer. The conducting compositions do not appear to be truly soluble according to strict definition and for the most part exhibit only limited solubility. The polymers can, however, be highly swelled in an organic vehicle or formed into a psuedo-solution sufficiently to be coated onto a substrate. A suitable film exhibiting conductivity can be prepared therefrom. Depending upon solids content, the film or coating may exhibit substantial light transmission. For example, a polymeric deposit of polypyrrole having a latex counteranion can be removed by scraping from the anode, comminuted or otherwise size reduced, and introduced into a solvent such as tetrahydrofuran. The resulting coating composition, containing the conductive polymer at a solids level of, for example, five weight percent, can be coated on a glass support and dried. The resulting polymer coating is both conductive and light transmissive.

Various adjuvants can be incorporated into the conductive polymers of the invention to provide particular and desired functionality. Thus, antioxidants, UV stabilizers, dyes, organic surfactants or other additives such as metallic flakes or carbon black can be used. The additives can be incorporated into the polymer used as the polyelectrolyte or can be incorporated by the processing of the conductive polymer. Alternatively, the additive can be present in the electrochemical cell during electropolymerization, provided that such presence does not adversely or materially interfere with the desired electropolymerization. The utilization of surfactants to improve the physical properties of electrochemically polymerized conductive organic polymers is described and claimed in the patent application of Alan Fischer and Edward P. Lindholm, U.S. Ser. No. 595,817, filed of even date, and now abandoned.

The invention will be further described by reference to the following Examples which are intended to be illustrative and non-limiting.

EXAMPLE 1

Part A.—A one-liter, round-bottomed flask was fitted with a condenser, mechanical stirrer, gas inlet (and outlet), thermometer, and dropping funnel. Water (586 grams) and 15 grams of COPS I copolymerizable surfactant (a short-chain vinyl sulfonate, 40% active, available from Alcolac, Inc.) were added to the flask. The contents were heated to 80° C. while purging with nitrogen. A pre-mix of the following monomers was prepared 131 grams methyl methacrylate; 263 grams ethyl acrylate; and five grams methacrylic acid. To the heated contents of the flask were added 15 mls. of the monomer pre-mix and 15 grams of potassium persulfate. The resulting mixture was heated at 80° C. for ten minutes. At this point, the nitrogen purge was placed above the liquid level and 67 mls. of the monomer pre-mix were added over a 35-minute period. The resulting latex was heated at 80° C. for an additional 30 minutes, was cooled at room temperature and was filtered through cheese cloth. The latex was dialyzed for ten days (molecular weight cut-off of 6000-8000). A sample was removed after one day of the dialysis.

Part B.—Twenty mls. of the ten day-dialyzed latex (prepared as described in Part A above) was placed into a conventional electrochemical apparatus comprising a single cell, platinum working and counter electrodes and a silver/silver nitrate reference electrode. The latex was cooled in an ice-water bath throughout the reaction under an argon blanket. Pyrrole (400 microliters) was added and polymerization thereof was run at one volt (against the reference electrode) for four hours at room temperature. A potentiostat was employed to control the potential of the electrode against the reference electrode. A black film was observed to form on the anode. The electrode was removed from the electrolytic cell and the polymer film was washed with water and air dried overnight. The polymer film was then removed from the electrode and heated at 105° C. for one hour. Conductivity ($\sigma$) of the resulting polymer ($6 \times 10^{-1}$ ohm$^{-1}$ cm.$^{-1}$) was measured using a four-probe conductivity measuring technique.

EXAMPLE 2

A 20-ml. sample of one-day dialyzed latex (prepared as described in Part A of Example 1 above) was added to an electrochemical apparatus (as described in Part B of Example 1). Pyrrole (300 microliters) was introduced and polymerized using the procedure described in Part B of Example 1, except that the polymerization was effected at one volt for five hours. The resulting polymer was washed with water and scraped from the electrode. The polymer sample was extracted with acetone. After air drying, the resulting film was measured for conductivity (12 ohm$^{-1}$ cm.$^{-1}$).

EXAMPLE 3

Part A.—A latex having polymer solids of 60% was prepared from the following ingredients:

|  | Grams | Wt. Percent |
| --- | --- | --- |
| 1. Water | 373.1 | 37.3 |
| 2. COPS I, 40% active | 16.6 | 1.7 |
| 3. n-Butyl Acrylate | 340.2 | 34.0 |
| 4. Methyl Methacrylate | 246.3 | 24.6 |
| 5. Methacrylic Acid | 7.8 | 0.8 |
| 6. Sodium Persulfate, 10% solution | 16.0 | 1.6 |
|  | 1000.0 | 100.0 |

Polymer Composition: BuA/MMA/MMA = 57.25/41.45/1.30

The above latex was prepared in the following manner. The water (1) and COPS I (2) were charged to a two-liter reaction kettle and heated to 80±1.0° C. while purging with nitrogen. A nitrogen blanket was maintained throughout the reaction. One percent of the monomer mixture and all of the catalyst were added to the kettle and the contents were allowed to react (10 to 16 minutes). Gradual addition of the remaining portion (99%) of monomer mixture was commenced and accomplished at a rate such that the addition was completed in two hours. (Some control of the monomer addition rate is required. The optimum rate will allow the reaction to proceed without external heating or cooling after about 5% of the monomer has been added. The rate should be such that no significant monomer pooling occurs. During the last five to ten percent conversion, some gentle external heating may be required to maintain reaction temperature. The agitation during this state is critical for good mixing). After completion of the monomer addition, the reaction contents were held at 80° to 83° C. for one hour. The contents were then cooled and discharged. The latex had the following physical properties: pH 2.6; polymer solids of 59.8%; Brookfield viscosity of 990 cps., Spindle #3 @ 60 rpm. The latex was dialyzed for ten days through a tubing with a molecular weight cut-off of 6000 to 8000. Solids content was 36.49%.

PART B.—The ten-day dialyzed latex (prepared in the manner described in Part A hereof) was diluted with water to about 12% solids and 20 mls. of the diluted latex was added to an electrochemical apparatus as described in Part B of Example 1. The pyrrole was polymerized overnight at room temperature at a potential of one volt. The polymer, still on the electrode, was placed in water for four days, was then washed in running water, removed from the electrode and dried. Conductivity of about $2 \times 10^{-4}$ ohm$^{-1}$ cm.$^{-1}$ was obtained using a four-probe measuring technique.

EXAMPLE 4

A latex was prepared in the manner described in Part A of Example 3, except that 2-sulfoethyl methacrylate, sodium salt was used in place of COPS I and dialysis was conducted for 20 hours through tubing with a molecular weight cut-off of 6000 to 8000, after neutralization to pH 7 with sodium hydroxide. Seven mls. of the resulting dialyzed latex as diluted to 20 mls. with water and added to an electrochemical apparatus as described in Part B of Example 1. Pyrrole (400 microliters) was added and polymerization was effected in the manner described in Part B of Example 1, except that polymerization conditions were 5.5 hours at room temperature and a potential of one volt. The resulting polymer, still on the electrode, was washed with water and allowed to stand at room temperature overnight. The polymer was removed from the electrode and heated for one hour at 105° C. A conductivity of about $3 \times 10^{-3}$ ohm$^{-1}$ cm.$^{-1}$ was measured using a standard four-probe technique.

EXAMPLE 5

A sample of dialyzed latex (prepared as described in Example 4) was diluted with water (seven mls. latex and 13 mls. water, 17% total solids). The diluted latex was added to an electrochemical apparatus as described in Example 1, Part B. Perfluorooctanoic acid, sodium salt (85 mgs.) was added, followed by 500 microliters of pyrrole. Polymerization was accomplished using the method described in Example 1, except that polymerization conditions were: 4.5 hours at room temperature and a potential of one volt. The polymer sample, still on the electrode, was washed with water, air dried overnight, removed from the electrode and dried at 105° C. for one hour. Conductivity (about $3 \times 10^{-1}$ ohm$^{-1}$ cm.$^{-1}$) was determined using a four-probe measuring technique.

EXAMPLE 6

Twenty mls. of the ten day-dialyzed latex, prepared as described in Part A of Example 1, and having a solids content of 6.25%, was placed in an electrochemical apparatus, as described in Part B of Example 1. Perfluorooctanoic acid, sodium salt (75 mgs.) was added. Pyrrole (500 microliters) was then added and polymerized as described in Example 1, except that polymerization conditions were: 4.5 hours at room temperature and a potential of one volt. The sample, still on the electrode, was washed with water and air dried overnight. The sample was then removed from the electrode and dried at 100° C. for one hour. Conductivity of the sample (about $7\times10^{-1}$ ohm$^{-1}$ cm.$^{-1}$) was determined by a four-probe measurement technique.

EXAMPLE 7

A latex was prepared in the manner described in Part A of Example 1, except that the gradual addition of the remaining 99% of monomer mixture was accomplished over a period of 1.25 hours and the post-heating of latex was for one hour at 80° C. The ten day-dialyzed latex sample was added to an electrochemical apparatus and polymerized, washed, dried and heated as is described in Part B of Example 1. A one-gram sample of the conductive polymer was sliced into small pieces using a razor blade and chopped in a Waring blender containing 15 mls. of acetone. The sample was stirred for several hours in the acetone, centrifuged for 1.5 minutes and decanted. The solid material was stirred overnight with approximately 15 mls. of tetrahydrofuran and was sonicated for 35 to 40 minutes. The sample was filtered through a ten-micron filter. The filtrate was recovered and a series of coatings was made by spin coating onto standard Fisher glass slides and allowing the coatings to air dry. Coating thicknesses were in the range of $9\times10^{-5}$ cm. to $2.7\times10^{-4}$ cm. The coatings had a smoked-gray appearance. Conductivity of each coating was measured using pressure contacts and a four-probe measuring technique; conductivity measurements in the range of from Transmission of the coated slides was in the range of from 64 to 85% over a range of 320 to 900 nanometers.

EXAMPLE 8

A sample (295 mgs.) of conductive polymer (prepared as described in Example 7) was added to 5.8 mls. of tetrahydrofuran and stirred for four days and sonicated for one hour. The resulting coating composition was spin cast onto a Fisher glass slide and air dried. The polymeric coating, smoked gray in appearance, was coated at a thickness of 4000 Angstrom. The coating was measured for conductivity ($3\times10^{-2}$ ohm$^{-1}$ cm.$^{-1}$). Transmission of the coated glass slide was about 60% over the range of 320 to 900 nanometers.

EXAMPLE 9

A commercially available latex having polyanionic surface character was employed for the production of a conductive polymer. Ten mls. of the latex, having an average particle size of 1115 Angstroms and a solids content of 51.65% (available as Saran #137, Dow Chemical Company, Midland, Mich.) was diluted with 40 mls. of water and was added to an electrochemical apparatus as described in Part B of Example 1. Pyrrole (400 microliters) was added and electropolymerization was effected in the manner described in Part B of Example 1, except that the reaction conditions were six hours at room temperature. The polymer film, still on the electrode, was rinsed with water and air dried over a weekend. The polymer was removed as a brittle polymer from the electrode and was dried in an oven at 105° C. for one hour. Conductivity of $3.33\times10\times^{-2}$ ohm$^{-1}$ cm.$^{-1}$ was measured. The brittle polymer was processed in organic solvent (tetrahydrofuran) to provide a coating composition which was used to provide a conductive film on a glass slide.

What is claimed is:

1. A processable electrically conductive organic polymer film comprising an electropolymerized polymer of an electropolymerizable monomer and having, as a counterion in affiliation with said electropolymerized polymer, a polymer having anionic surface character, the counterion polymer being in a dispersed phase during the electropolymerization of said electropolymerizable monomer and being effective to confer processability to said conductive organic polymer.

2. The conductive polymer film of claim 1 comprising repeating units of the formula

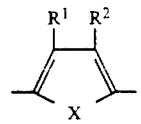

wherein each of $R^1$ and $R^2$ is independently hydrogen, alkyl, aryl, alkaryl or aralkyl, or $R^1$ and $R^2$ together comprises the atoms necessary to complete a cyclic structure; and X is —O—, —S—or

wherein $R^3$ is hydrogen, alkyl, aryl, alkaryl or aralkyl.

3. The conductive polymer film of claim 2 wherein X is

4. The conductive polymer film of claim 3 wherein $R^3$ is hydrogen.

5. The conductive polymer film of claim 4 wherein each of $R^1$ and $R^2$ is hydrogen.

6. The conductive polymer film of claim 1 wherein said counterion polymer having anionic surface character comprises polymeric latex particles.

7. The conductive polymer film of claim 6 wherein said polymeric latex particles include repeating units from an ethylenically unsaturated polymerizable monomer having a strong anionic group, said repeating units being sufficient to confer said anionic surface character to said polymeric latex particles.

8. The conductive polymer film of claim 7 wherein said anionic group comprises a sulfate or sulfonate group.

9. The conductive polymer film of claim 6 wherein said polymeric latex particles include an anionic surfactant therein, said surfactant being sufficient to confer said anionic surface character to said polymer latex particles.

10. The conductive polymer film of claim 9 wherein said anionic surfactant has a sulfate or sulfonate anionic moiety.

11. The conductive polymer film of claim 6 wherein said polymeric counterion latex particles comprise repeating units from a short-chain vinyl sulfonate, methyl methacrylate, ethyl acrylate and methacrylic acid.

12. The conductive polymer film of claim 6 wherein said polymeric counterion latex particles comprise repeating units from a short-chain vinyl sulfonate, n-butyl acrylate, methyl methacrylate and methacrylic acid.

13. The conductive polymer of claim 6 wherein said polymeric counterion latex particles comprise repeating units from the sodium salt of 2-sulfoethyl methacrylate, butyl acrylate, methyl methacrylate and methacrylic acid.

14. The conductive polymer film of claim 1 wherein said counterion polymer comprises a major proportion by weight of the conductive polymer film.

15. The conductive polymer film of claim 1 wherein said counterion polymer comprises from about 75% to about 97% by weight of the conductive polymer film and repeating units from said electropolymerizable monomer comprise from about 3% to about 25% by weight of the conductive polymer film.

16. A conductive polypyrrole film having improved processability comprising a cationic polymer of repeating $\alpha$-$\alpha'$-polymerized pyrrole units and a counterion in affiliation therewith, said counterion comprising an organic polymer having anionic surface character and being in a dispersed phase during electropolymerization of pyrrole, and being effective to confer said processability to said conductive polypyrrole.

17. The conductive polypyrrole film of claim 16 wherein said counterion polymer having anionic surface character comprises polymeric latex particles.

18. The conductive polypyrrole film of claim 17 wherein said polymeric latex particles include repeating units from an ethylenically unsaturated polymerizable monomer having a strong anionic group, said repeating units being sufficient to confer said anionic surface character to said polymeric latex particles.

19. The conductive polypyrrole film of claim 18 wherein said anionic group comprises a sulfate or sulfonate group.

20. The conductive polypyrrole film of claim 19 wherein said polymeric latex particles include repeating units from a polymerizable ethylenically unsaturated monomer having a sulfate or sulfonate group and at least one other copolymerizable ethylenically unsaturated monomer.

21. The conductive polypyrrole film of claim 20 wherein said polymerizable ethylenically unsaturated monomer is a short-chain vinyl sulfonate.

22. The conductive polypyrrole film of claim 20 wherein said polymerizable ethylenically unsaturated monomer is the sodium salt of 2-sulfoethyl methacrylate.

23. The conductive polypyrrole film of claim 17 wherein said polymeric counterion latex particles comprise repeating units from a short-chain vinyl sulfonate, methyl methacrylate, ethyl acrylate and methacrylic acid.

24. The conductive polypyrrole polymer film of claim 17 wherein said polymeric counterion latex particles comprise repeating units from a short-chain vinyl sulfonate, n-butyl acrylate, methyl methacrylate and methacrylic acid.

25. The conductive polypyrrole polymer of claim 17 wherein said polymeric counterion latex particles comprise repeating units from the sodium salt of 2-sulfoethyl methacrylate, butyl acrylate, methyl methacrylate and methacrylic acid.

26. The conductive polypyrrole film of claim 16 wherein said counterion polymer comprises a major proportion by weight of the conductive polypyrrole film.

27. The conductive polypyrrole film of claim 16 wherein said counterion polymer comprises from about 75% to about 97% by weight of the conductive polypyrrole and said repeating $\alpha$, $\alpha'$-polymerized pyrrole units comprise from about 3% to about 25% by weight of the conductive polypyrrole film.

* * * * *